(12) United States Patent
Chien et al.

(10) Patent No.: US 7,399,126 B2
(45) Date of Patent: Jul. 15, 2008

(54) OPTICAL FIBER SOCKET

(75) Inventors: Min-Lung Chien, Hsin-Tien (TW);
Kai-Ray Cheng, Hsin-Tien (TW); Jian Cheng, Hsin-Tien (TW)

(73) Assignee: Advanced Connectek Inc., Hsin-Tien, Taipei Hsien (TW)

( * ) Notice: Subject to any disclaimer, the term of this patent is extended or adjusted under 35 U.S.C. 154(b) by 0 days.

(21) Appl. No.: 11/621,059

(22) Filed: Jan. 8, 2007

(65) Prior Publication Data

US 2007/0172178 A1    Jul. 26, 2007

(30) Foreign Application Priority Data

Jan. 20, 2006    (TW) .............................. 95201273 U

(51) Int. Cl.
*G02B 6/36*    (2006.01)

(52) U.S. Cl. .............................. 385/92; 385/76; 385/88; 385/89; 385/139

(58) Field of Classification Search ................... 385/88, 385/89, 92, 53, 14, 49, 76, 77, 78, 139, 93, 385/94

See application file for complete search history.

(56) References Cited

U.S. PATENT DOCUMENTS

| | | | | |
|---|---|---|---|---|
| 4,362,360 A | * | 12/1982 | Mannschke | ................... 385/88 |
| 4,840,451 A | * | 6/1989 | Sampson et al. | ............... 385/89 |
| 5,155,784 A | * | 10/1992 | Knott | ........................... 385/88 |
| 6,592,269 B1 | * | 7/2003 | Brophy et al. | ................. 385/92 |
| 6,739,765 B1 | * | 5/2004 | Liu | .............................. 385/92 |
| 2002/0146219 A1 | * | 10/2002 | Cheng | ........................... 385/92 |
| 2007/0172178 A1 | * | 7/2007 | Chien et al. | ................... 385/92 |

* cited by examiner

*Primary Examiner*—Brian M Healy
(74) *Attorney, Agent, or Firm*—patenttm.us

(57) ABSTRACT

An optical fiber socket includes a hollow insulative housing, two openings in a bottom face of the insulative housing for receiving two optical fiber plugs and two illuminating elements accommodated inside the insulative housing for connection with the optical fiber plugs. The insulative housing has a first baffle and a second baffle to divide the insulative housing into a first receiving space for receiving therein one illuminating element, a second receiving space for receiving therein the other illuminating element. Terminals are provided to engage with the illuminating element in the first receiving space and have elongated ends extending out of the insulative housing thereof such that two optical fiber plugs in connection to the insulative housing are able to complete information input/output.

6 Claims, 5 Drawing Sheets

OPTICAL FIBER SOCKET

BACKGROUND OF THE INVENTION

1. Field of the Invention

The present invention relates to an optical socket, and more particularly to an optical fiber socket having two openings defined in a side face of the socket to allow two optical fiber plugs to insert into the tow openings to complete signal input and output with the optical fiber socket.

2. Description of the Prior Art

Following the advancement of the modern technology, what matters to information transmission is speed. Speed controls almost everything in our daily lives. That is, if someone has the speed advantage, he/she takes the lead and will keep on leading the others until the advantage is lost. Therefore, speed is everything in the modern society. To cope with the requirements, a concept of using an optical fiber filament as the signal carrier is introduced to the market. The optical fiber filament has the advantages of fast signal transmission speed, clear signal and less signal loss. Due to the advantages, the optical fiber filament is becoming more popular each day.

In order to complete signal transmission between two optical fibers, an optical fiber connector is invented. This type of optical fiber connector is made of plastic and used mainly in short range signal transmission in only one direction. That is to say, the conventional optical fiber connector can only allow signal to go from one point to the other point and not vice versa. As the vast need of mass information transmission, an optical fiber connector allowing two-way signal transmission is invented to facilitate the signal transmission speed. However, this type of optical fiber connector which allows signal to be transmitted both ways is actually composed of two individual optical fiber connectors with a fixture interconnecting the two optical fiber connectors. With the fixture to interconnect the two individual optical fiber connectors, the overall dimension of the optical fiber connector is enormous, and the manufacture cost is high. Bulky dimension of the optical fiber connector can never be an option for the user in that there will be no room in the appliance to receive such a dimension. Secondly, increasing manufacture cost will be a nightmare for the manufacturers because the profit will be decreased in such a competitive market.

To overcome the shortcomings, the present invention tends to provide an improved optical fiber socket to mitigate the aforementioned problems.

SUMMARY OF THE INVENTION

The primary objective of the present invention is to provide an improved optical fiber socket to allow connection of two optical fiber plugs so that signal transmission can be completed in both ways.

In order to accomplish the aforementioned objective, the optical fiber socket of the present invention is composed of an insulation hollow seat, two illuminating elements, two terminals and an end block. The insulative housing is substantially rectangular and has tow baffles formed therein to divide the interior of the seat into a first receiving space, a second receiving space and an intermediate receiving space sandwiched between the first receiving space and the second space. An engaging end of the first illuminating element and of the second illuminating element is accommodated in the second receiving space and the second receiving space respectively. A conducting end of the first illuminating element and of the second illuminating element is connected to one another via the terminals such that after insertion of two optical fiber plugs into two openings defined in a side face of the insulative housing, optical signal input and output is completed.

Other objects, advantages and novel features of the invention will become more apparent from the following detailed description when taken in conjunction with the accompanying drawings.

DETAILED DESCRIPTION OF THE PREFERRED EMBODIMENT

Figure 1:
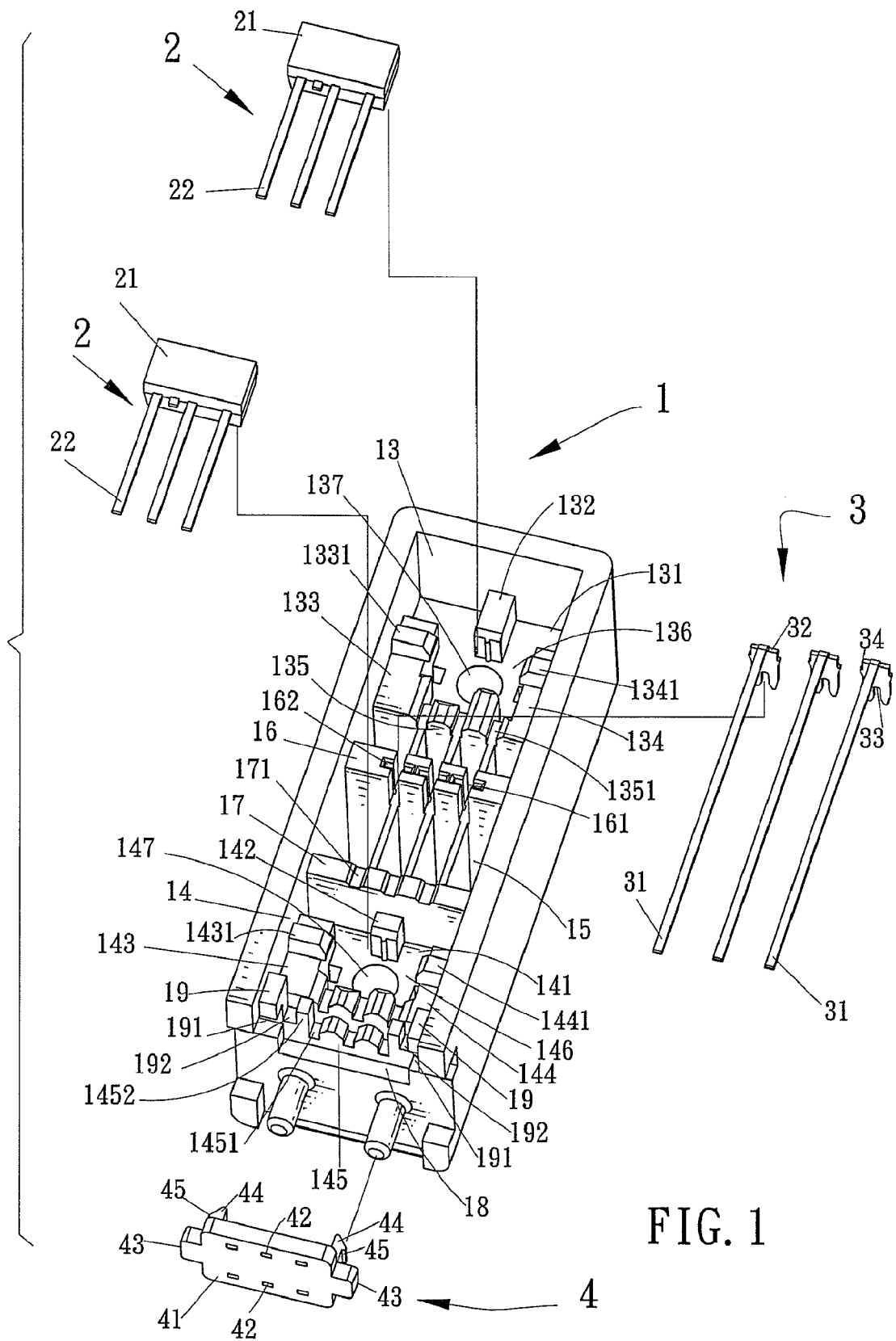
FIG. 1 is an exploded perspective view of the optical fiber socket of the present invention.
Figure 5:
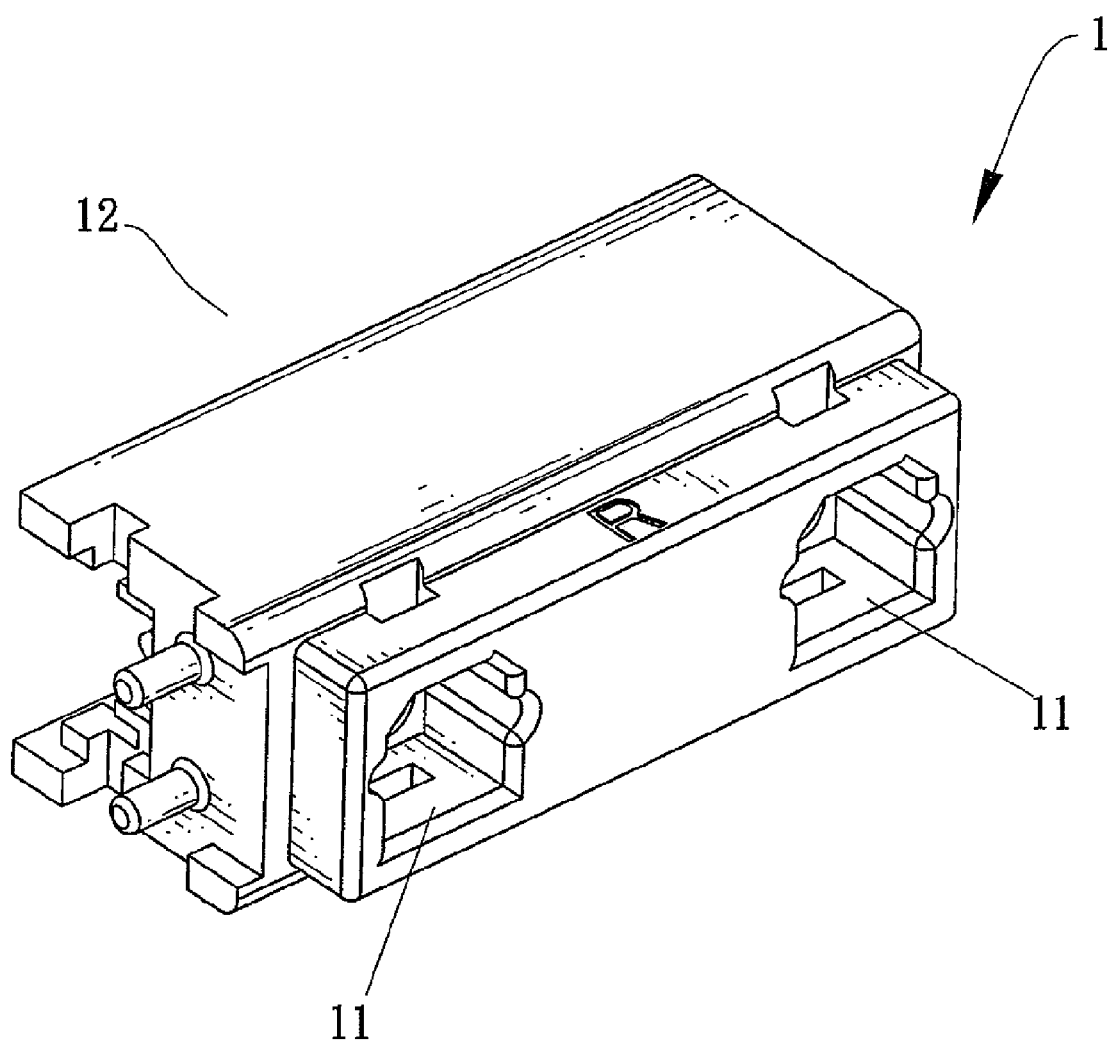
FIG. 5 is a perspective view showing that the optical fiber socket of the present invention is provided with two openings defined in a bottom face of the insulative housing.

With reference to FIGS. 1 and 5, it is noted that the optical fiber socket constructed in accordance with the present invention includes an insulative seat (1), two illuminating elements (2), three terminals (3) and an end block (4).

The insulative housing (1) is substantially rectangular in shape and provided with two openings (11) defined in a bottom face of the insulative housing (1) and a top opening (12) defined in a top face of the insulative housing (1) to be communicated with the two openings (11). A first baffle (16) and a second baffle (17) are mounted inside the hollow seat (1) to divide the interior of the hollow seat (1) into a first receiving space (13), a second receiving space (14) and an intermediate receiving space (15) which is sandwiched between the first receiving space (13) and the second receiving space (14). A first group of protrusions, a first top protrusion (132), a first left protrusion (133), a first right protrusion (134) corresponding to and facing the first left protrusion (133) and a first bottom protrusion (135) corresponding to and facing the first top protrusion (132), is formed on a bottom face (131) of the first receiving space (13). A second group of protrusions, a second top protrusion (142), a second left protrusion (143), a second right protrusion (144) corresponding to and facing the second left protrusion (143) and a second bottom protrusion (145) corresponding to and facing the second top protrusion (142), is formed on a bottom face (141) of the second receiving space (14). The first left protrusion (133) has a top first boss (1331) formed thereon, the first right protrusion (134) has a top second boss (1341) formed thereon to correspond to the top first boss (1331) and the first bottom protrusion (135) has top passages (1351) formed thereon. The second left protrusion (143) has a bottom first boss (1431) formed thereon, the second right protrusion (144) corresponding to the second left protrusion (143) has a bottom second boss (1441) formed thereon to correspond to the bottom first boss (1431) and the second bottom protrusion (145) has a bottom passages (1451) formed thereon. The first group of protrusions surrounds a firs area (136) and the second group of protrusions surrounds a second area (146). The bottom face (131) of the first receiving space (13), as well as the first area (136), is provided with a first through hole (137) through which the first receiving space (13) communicates with one of the two openings (11). The bottom face (141) of the second receiving space (14), as well as the second area (146), has a second through hole (147) through which the second receiving space (14) communicates with the other one of the two openings (11).

The first baffle (16) has plural slits (161) and each inner side face defining the slit (161) is provided with a groove such that a guiding track (162) is formed on two adjacent inner side faces defining the slit (161) and communicates with a corresponding slit (161). The second baffle (17) has trenches (171) each corresponding to one of the slits (161) of the first baffle (16). A side face of the second receiving space (14) has a cutout (18) and two L-shaped stops (19) respectively provided or mounted on two opposite sides defining the cutout (18). A protrusion (1452) is formed adjacent but spaced away from a corresponding one of the two stops (19). Due to the provision of the two L-shaped stops (19), a receiving recess (191) is defined in each of the L-shaped stops (19). Also, due to the provision of the protrusions (1452), a passage (192) is defined between one of the two L-shaped stops (19) and one of the protrusions (1452).

Each illuminating element (2) is an electronic component responsible for signal transmission and has an engaging end (21) and conducting ends (22). The engaging end (21) of one of the two illuminating elements (2) is accommodated in the first receiving space (13). To be more specific, one of the two illuminating elements (2) is accommodated in the first area (136) and the engaging end (21) of the one of the two illuminating elements (2) is clamped by the top first boss (1331) and the top second boss (1341). The conducting ends (22) of this two illuminating elements (2) extend out from the top passages (1351) of the first bottom protrusion (135). The engaging end (21) of the other one of the two illuminating elements (2) is accommodated in the second area (146) and clamped by the bottom first boss (1431) and the bottom second boss (1441). As a result, the two illuminating elements (2) are respectively secured inside the first area (136) and the second area (146). Furthermore, the conducting ends (22) of the other one of the two illuminating elements (2) extend out of the bottom passages (1451) defined in the second bottom protrusion (145) and out of the hollow seat (1).

Each terminal (3) has an elongated end (31), a connecting end (32), a substantially U-shaped indent (33) defined in a bottom face of the connecting end (32) and two ears (34) respectively formed on two opposed sides of the connecting end (32).

The connecting end (32) of each terminal (3) is accommodated in a corresponding one of the slits (161) via sliding into a corresponding one of the guiding tracks (162).

Figure 2:
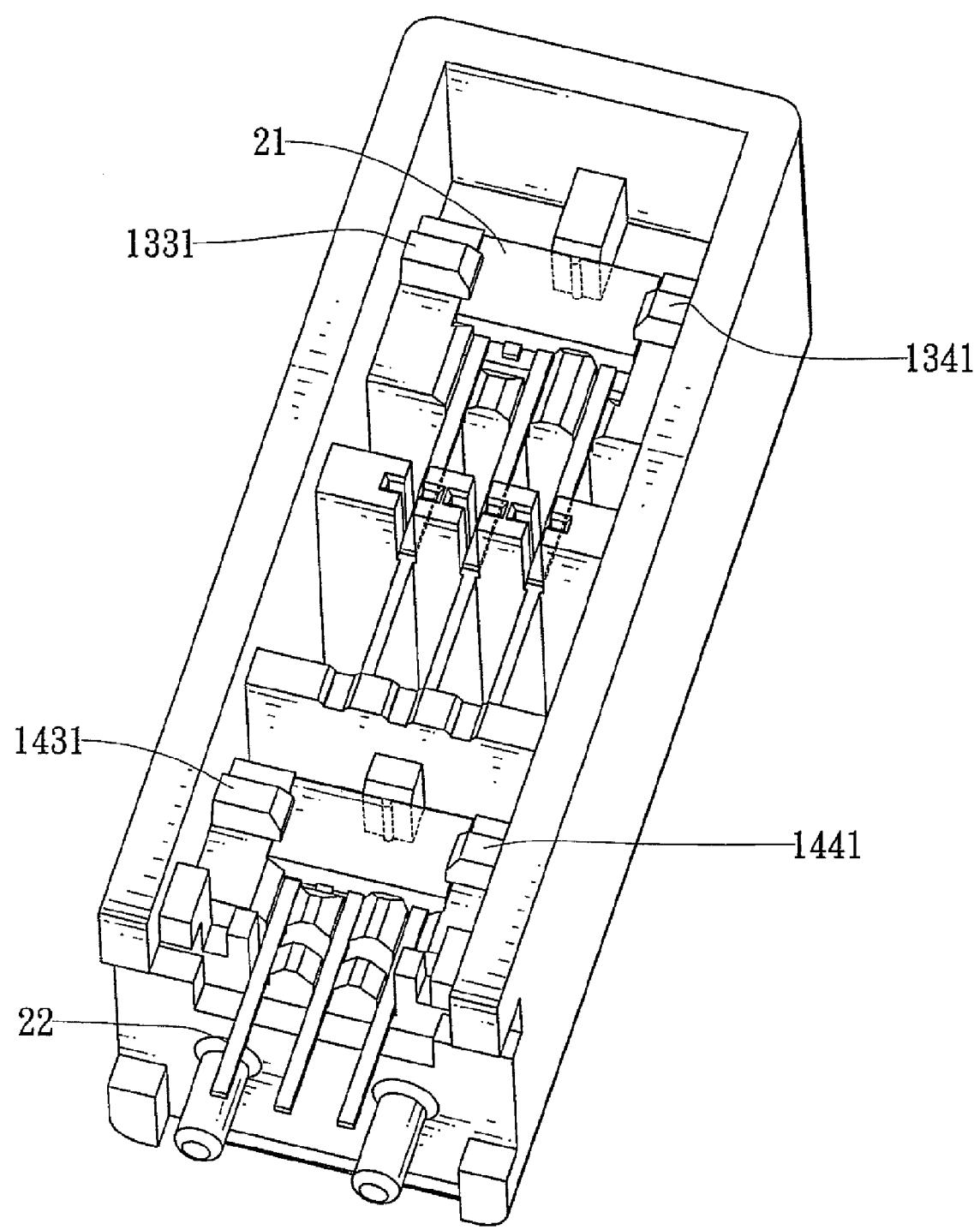
FIG. 2 is a perspective view showing that two illuminating elements are accommodated in the insulative housing.
Figure 3:
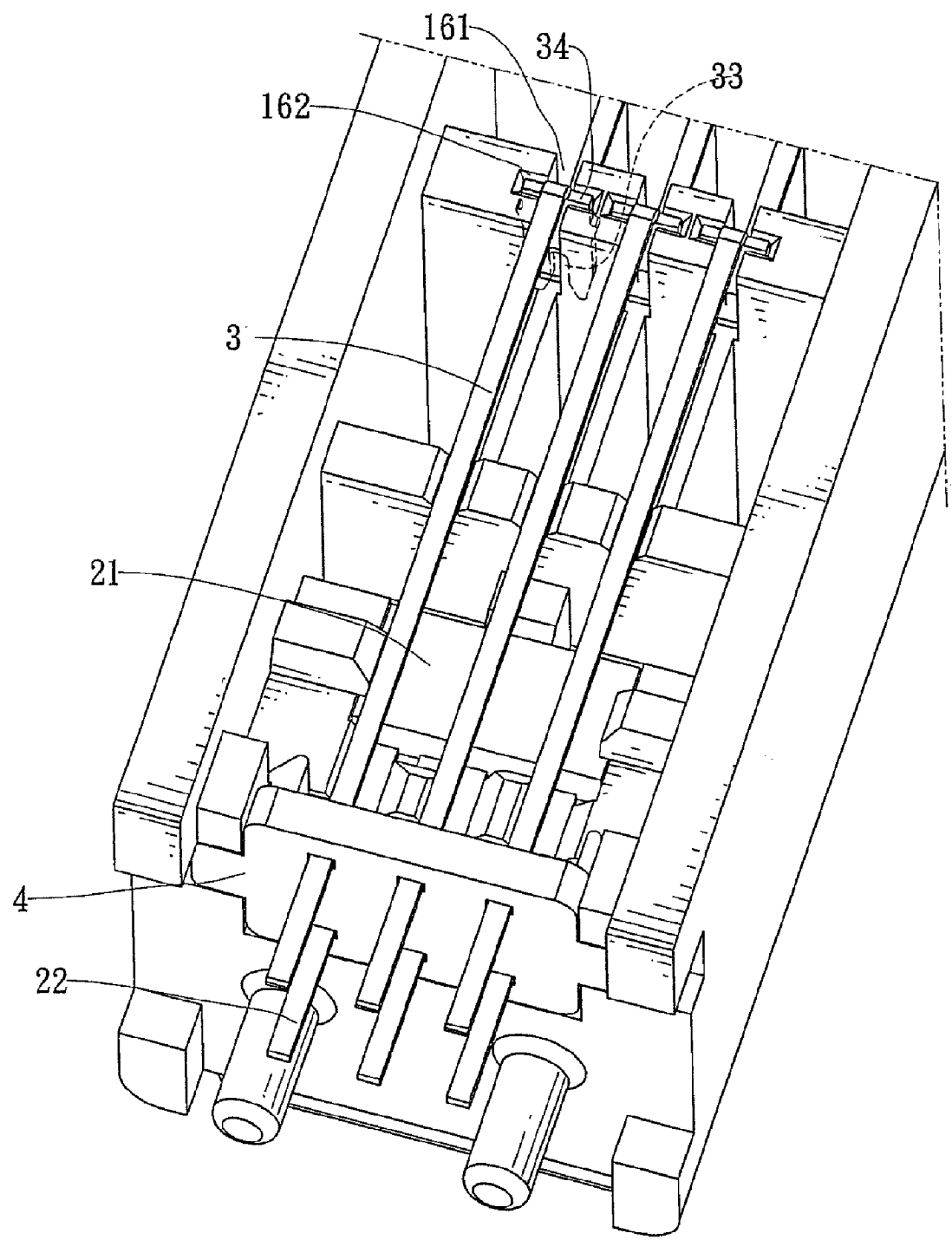
FIG. 3 is a perspective view showing that the two terminals are accommodated in the insulative housing.

From the depiction of FIGS. 2 and 3, it is noted that before the connecting end (32) is accommodated in one of the slits (161), the conducting ends (22) of the illuminating element (2) which is accommodated in the first area (136) is already extended out of the top passages (1351) and into the slits (161), such that after the connecting ends (32) are accommodated in the corresponding slits (161), the conducting ends (22) of the two illuminating elements (2) are securely engaged with the connecting ends (32) in that the conducting ends (22) of the two illuminating elements (2) are securely accommodated in the U-shaped indents (33) of the terminals (3).

The end block (4) is provided to secure the conducting ends (22) of the illuminating element (2) accommodated in the second area (146) and the elongated ends (31) of the terminals (3). To accomplish the objective, the end block (4) is provided with a body (41), two rows of through holes (42) defined through the body (41) to respectively correspond to the conducting ends (22) and the elongated ends (31), two ledges (43) respectively extending from two opposed sides of the body (41) to be accommodated in the receiving recesses (191), two arms (44) extending out from a rear side face of the body (41) and two hooks (45) each formed on a corresponding free end of the two arms (44).

Figure 4:
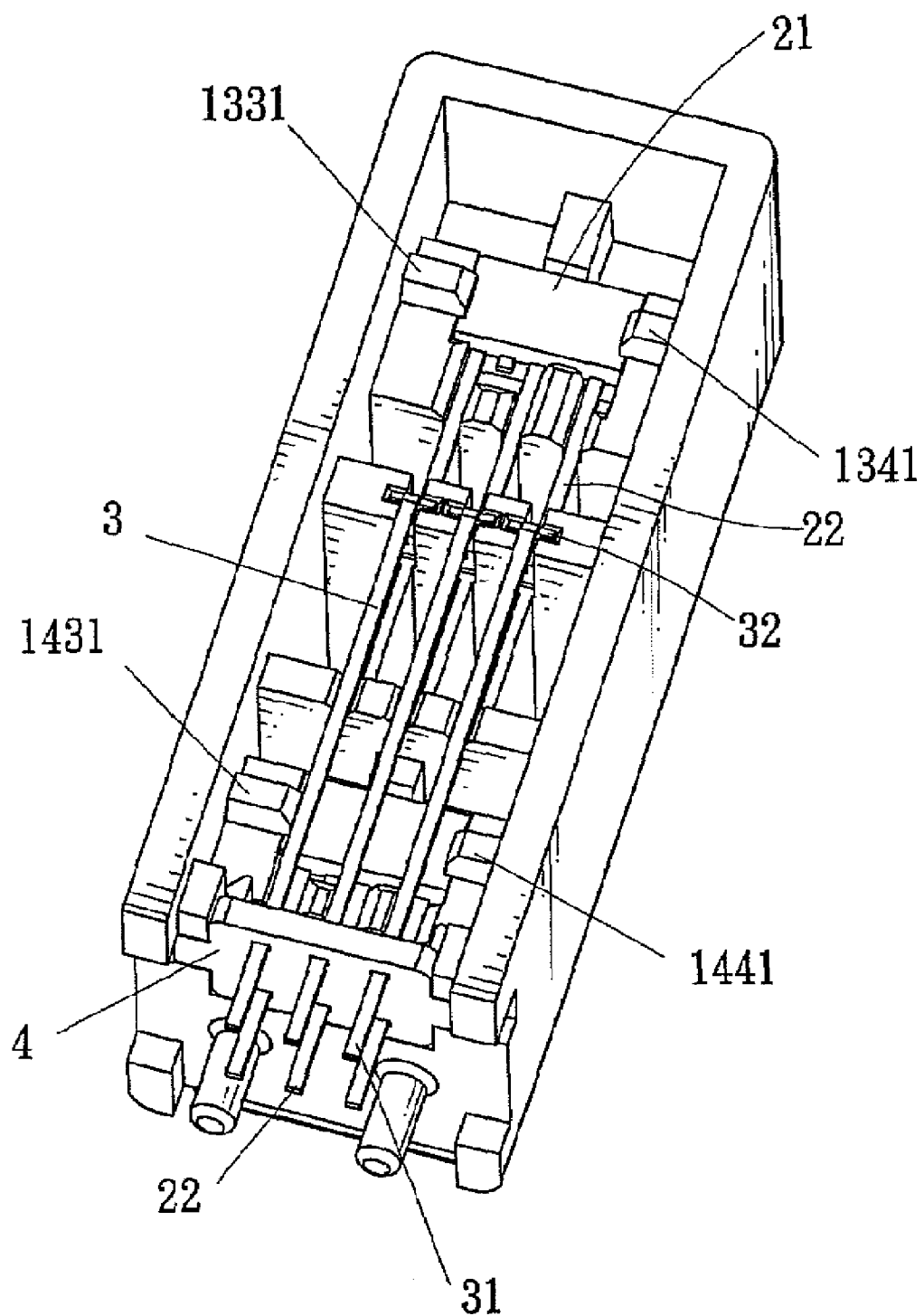
FIG. 4 is a perspective view showing that the two terminals are mounted to complete the assembly of the optical fiber socket of the present invention.

With reference to FIGS. 4 and 5 while still using FIGS. 2 and 3 for reference, it is noted that when the optical fiber socket of the present invention is assembled, the two illuminating elements (2) are respectively accommodated in the first area (136) and the second area (146) with the conducting ends (22) of the illuminating element (2) which is accommodated in the first area (136) being rested in the slits (161) of the first baffle (16) and the conducting ends (22) of the illuminating element (2) which is accommodated in the second area (146) being rested in the bottom passages (1451) and extended out of one row of through holes (42) of the end block (4) after the end block (4) is securely accommodated in the cutout (18) with the hooks (45) of the two arms (44) extending over the passages (192) and engaging with a respective rear side face of the stops (19).

Then the connecting ends (32) of the terminals (3) are respectively accommodated in the slits (161) via sliding into the guiding tracks (162) with the U-shaped indent (33) clamping each and every one of the conducting ends (22) of the illuminating element (2) which is accommodated in the first area (136). Due to the ears (34) extending from two opposed sides of the connecting end (32) of the terminal (3), after the terminal (3) is accommodated in the corresponding slit (161), the terminal (3) is thus securely accommodated inside the corresponding slit (161). In addition, the elongated ends (31) of the terminals (3), which are electrically connected to the conducting ends (22) of the illuminating element (2) accommodated in the first area (136), are extended through the other row of the through holes (42) of the end block (4) after passing through bottom passages (1451) of the second bottom protrusion (145). After the conducting ends (22) of the illuminating element (2) and the elongated ends (31) of the terminals (3) extend out of the through holes (42) of the end block (4), the optical fiber socket of the present invention is ready for connection with a printed circuit board (PCB). The optical fiber plug (not shown) extended into the two openings (1) are thus electrically connected to the two illuminating elements (2) respectively to complete a signal transmission loop.

The same principle may apply to three openings, four openings . . . etc. to allow plural optical fiber plugs to complete two-way information input/output transmission.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber socket adapted to be mounted on a circuit board, the optical fiber socket comprising:
  an insulative housing defined therein a first receiving space, a second receiving space and an intermediate receiving space sandwiched between the first receiving space and the second receiving space, wherein the first receiving space and the second receiving space both have a bottom face and two openings defined in the respective bottom face of the first receiving space and the second receiving space of the insulative housing for receiving two optical fiber plugs;

a first illuminating element having a conducting end accommodated in the first receiving space;

a second illuminating element having a conducting end accommodated in the second receiving space;

plural terminals each having a connecting end and an elongated end; and an end block accommodated in the insulative housing so as to firmly position the second illuminating element and the terminals, wherein the circuit board and the second illuminating element is electrically connected to one another and the first illuminating element is electrically connected to the circuit board by way of the terminals; and a baffle between the first receiving space and the intermediate receiving space has plural slits for extension of the conducting ends of each of the illuminating elements, each slit has a pair of guiding tracks defined in two opposed sides defining the slit to receive therein the connecting ends of the terminals, a side wall between the intermediate receiving space and the second receiving space has trenches to receive therein the elongated ends of the terminals.

2. The optical fiber socket as claimed in claim 1, wherein the first receiving space and the second receiving space each has bosses and a through hole formed on the respective bottom face of the first receiving space and the second receiving space, the respective through hole communicates with openings defined in the insulative housing.

3. The optical fiber socket as claimed in claim 2, wherein top bosses are formed on the bottom face of the first receiving space and bottom bosses are formed on the bottom face of the second receiving space, both top bosses and bottom bosses are provided to secure the illuminating elements, protrusions are formed on a side wall of the second receiving space and have passages defined to allow extension of the conducting ends of the illuminating elements.

4. The optical fiber socket as claimed in claim 1, wherein each terminal has a substantially U-shaped indent defined in a bottom face of the connecting end thereof and two interference portions respectively formed on two opposed sides of the connecting end to securely engage with a side wall of the trench.

5. The optical fiber socket as claimed in claim 3, wherein two stops are respectively provided on two opposite sides of the second receiving space and each stop has a receiving space and a passage defined between one of the two stops and one of the protrusions.

6. The optical fiber socket as claimed in claim 1, wherein the end block has two rows of through holes, two ledges respectively extending from two opposed sides thereof to be accommodated in the receiving recesses, two arms extending out from a rear side face thereof and the passages between the protrusions and the stops and two hooks each formed on a corresponding free end of the two arms.

\* \* \* \* \*